(12) United States Patent
Velsher

(10) Patent No.: US 6,807,346 B2
(45) Date of Patent: Oct. 19, 2004

(54) METHOD FOR ATTACHING MULTIPLE LIGHT SOURCES TO AN OPTOELECTRONIC MODULE

(75) Inventor: Benne Velsher, Littleton, MA (US)

(73) Assignee: Optovia Corporation, Acton, MA (US)

(*) Notice: Subject to any disclaimer, the term of this patent is extended or adjusted under 35 U.S.C. 154(b) by 83 days.

(21) Appl. No.: 10/376,102

(22) Filed: Mar. 1, 2003

(65) Prior Publication Data

US 2004/0170359 A1 Sep. 2, 2004

(51) Int. Cl.[7] .............................. G02B 6/00; G02B 6/30
(52) U.S. Cl. ........................... 385/49; 385/88; 385/147
(58) Field of Search ............................ 385/31, 39, 49, 385/50, 51–52, 88–90, 147

(56) References Cited

U.S. PATENT DOCUMENTS

| | | | | |
|---|---|---|---|---|
| 5,539,848 A | * | 7/1996 | Galloway | 385/89 |
| 5,570,444 A | | 10/1996 | Janssen | 385/90 |
| 5,625,734 A | * | 4/1997 | Thomas et al. | 385/88 |
| 5,675,684 A | | 10/1997 | Hirataka et al. | 385/88 |
| 5,818,994 A | | 10/1998 | Hehmann | 385/89 |
| 6,356,688 B2 | | 3/2002 | Blom | 385/52 |
| 6,729,771 B2 | * | 5/2004 | Kim et al. | 385/76 |
| 2003/0002820 A1 | * | 1/2003 | Nakanishi et al. | 385/88 |
| 2003/0026556 A1 | * | 2/2003 | Mazotti et al. | 385/92 |
| 2003/0113071 A1 | * | 6/2003 | Kim et al. | 385/76 |
| 2003/0113077 A1 | * | 6/2003 | Xu et al. | 385/93 |
| 2003/0169475 A1 | * | 9/2003 | Reznik et al. | 359/245 |
| 2003/0201462 A1 | * | 10/2003 | Pommer et al. | 257/200 |
| 2004/0047570 A1 | * | 3/2004 | Lo et al. | 385/92 |
| 2004/0047637 A1 | * | 3/2004 | Wang et al. | 398/164 |

* cited by examiner

Primary Examiner—Akm Enayet Ullah
(74) Attorney, Agent, or Firm—Irwin Ostroff; Erwin P. Pfeifle

(57) ABSTRACT

A plurality of n light sources are coupled to an optoelectronic module by first coupling a light detector to an optical output port of the optoelectronic module after the module is attached to a carrier member. The plurality of n light sources are sequentially moved adjacent a separate one of a plurality of n optical input ports of the optoelectronic module while pulsing the light source being moved with a low power signal sufficient to prevent failure of the light source. Each light source is permanently affixed adjacent the associated separate one of the n optical input ports when a maximum light intensity signal propagating through the optoelectronic module from that light source is detected by the light detector. A heat dissipating means is attached to a base of the carrier member capable of removing sufficient heat from the n radiation sources and the module to prevent overheating during normal operation thereof.

16 Claims, 2 Drawing Sheets

METHOD FOR ATTACHING MULTIPLE LIGHT SOURCES TO AN OPTOELECTRONIC MODULE

FIELD OF THE INVENTION

The present invention relates to method for attaching a plurality of light sources to a single optoelectronic module such as an optical integrated circuit.

BACKGROUND OF THE INVENTION

Current techniques for coupling a light source to an optical device or component involves the active alignment and attachment of passive optical devices, such as an optical fiber and/or lens, to a light source that remains stationary while the light source is powered to produce a light signal. Therefore, in a conventional assembly sequence, the light source is attached and connected to a substrate with a heat sink before the other parts of a component are introduced. The other parts of the component are then manipulated while the light source is activated to optimize the coupling of light between the various components. This assembly sequence technique is adequate for components that use a single light source. Where a plurality of light sources are to be coupled to a component, the conventional assembly sequence can only be performed with a lensed optical train where each lens train may have to be manipulated for light coupling optimization.

It is desirable to provide a technique for coupling a plurality of radiation or light sources to a single module or component without the manipulation of lens trains.

SUMMARY OF THE INVENTION

The present invention is directed to a technique for attaching a plurality of radiation sources to a single optoelectronic module such as an optical integrated circuit.

From a first method aspect, the present invention is a method of forming an assembly comprising a plurality of n radiation sources which each require heat dissipating means during normal operation thereof, a module comprising a plurality of n radiation input ports and an output port. Initially the module is attached on a carrier member. A first radiation source is turned on and operated at a substantially lower power level than is used during normal operation thereof such that the first radiation source is not caused to fail even without the heat dissipating means being coupled thereto. The first radiation source is positioned relative to a first one of the n radiation input ports such that radiation emitted by the first radiation source is incident on the first radiation port. The first radiation source is repositioned while it is powered with the substantially lower power than is used during normal operation until a signal emitted at the output port of the module has a maximum level. The first radiation source is then attached to the carrier member. This procedure is then repeated for each of the remaining n−1 plurality of radiation sources.

From a second method aspect, the present invention is a method of coupling a plurality of n light sources to an optoelectronic module comprising a plurality of n optical input ports and an optical output port. Initially the optoelectronic module is attached to a carrier member. A light detector is coupled to the optical output port of the module. Each of the plurality of n light sources is sequentially moved adjacent a separate one of the plurality of n optical input ports while pulsing the light source being moved with a low power signal sufficient to prevent failure of the light source. Each of the light sources is then attached adjacent the separate one of the n optical input ports when a maximum light intensity signal propagating through the optoelectronic module from the light source is detected by the light detector. Heat dissipating means, if needed, is attached to a base of the carrier member which is capable of removing sufficient heat from the n light sources and the optoelectronic module to prevent failure during normal operation thereof.

From a third method aspect, the present invention is a method of coupling a plurality of n light sources to an optoelectronic module comprising a plurality of n optical input ports and an optical output port. Initially, the optoelectronic module is attached to a carrier member. A light detector is coupled to the optical output port of the module. A first one of the plurality of light sources is moved adjacent a separate one of the plurality of n optical input ports while pulsing the light source with a low power signal sufficient to prevent failure of the light source. The first one of the light sources is attached adjacent the separate one of the n optical input ports when a maximum light signal propagating through the optoelectronic module from the light source is detected by the light detector. Then the same procedure is repeated for each of remaining n−1 plurality of light sources. Heat dissipating means, if needed, is attached to a base of the carrier member capable of removing sufficient heat from the n light sources and the light detector to prevent failure thereof during normal operation thereof.

From a fourth method aspect the present invention is a method of forming an assembly comprising n radiation sources which each require heat dissipating means during normal operation, where n is a number greater than one, and a radiation sensitive detector having m inputs, where m is a number greater than one, and having an output port. The radiation detector is attached to a carrier member. A first one of the n radiation sources is turned on and it is operating at a substantially lower power than is used during normal operation such that same does not overheat even without the heat dissipating means being coupled thereto. The first radiation source is positioned relative to a first one of the m inputs of the detector such that radiation emitted by the first radiation source is incident on the first input of the detector. The first radiation source is repositioned while it is powered with the substantially lower power than is used during normal operation until a signal emitted at the output of the detector reaches a maximum level. The first radiation source is then fixedly attached to the carrier member. The above steps for the first radiation source is repeated for a second one of the n radiation sources. The above steps for the first radiation source is again repeated for any additional radiation sources. Heat dissipating means, if needed, is then attached to a base of the carrier member capable of removing sufficient heat from the n radiation sources and the radiation detector during normal operation thereof.

From a fifth method aspect the present invention is a method of forming an assembly comprising n chips, where n is greater than 1, with at least one of the n chips having formed therein two radiation sources which requires heat dissipating means during normal operation thereof, with each of the remaining n−1 chips having formed therein at least one radiation source which requires heat dissipating means during normal operation thereof, and a radiation detector comprising a plurality of radiation input ports and an output port. The radiating detector is attached to a carrier member. The two radiation sources of one of the n chips are turned on and operated at a substantially lower power level than is used during normal operation thereof such that the two radiation sources are not caused to fail even without heat dissipating means being coupled thereto. The one of the n chips is positioned relative to a first set of the radiation input ports such that radiation emitted by the two radiation sources of the one chip is incident on separate ones of the radiation inputs ports. The one chip is then repositioned while the two radiation sources thereof are powered with the substantially lower power than is used during normal operation until a signal emitted at the output port of the module has a maximum level. The one chip is attached to the carrier member. The above steps are then repeated for each of the remaining n−1 chips.

The invention will be better understood from the following more detailed description taken with the accompanying drawings and claims.

Figure 1:
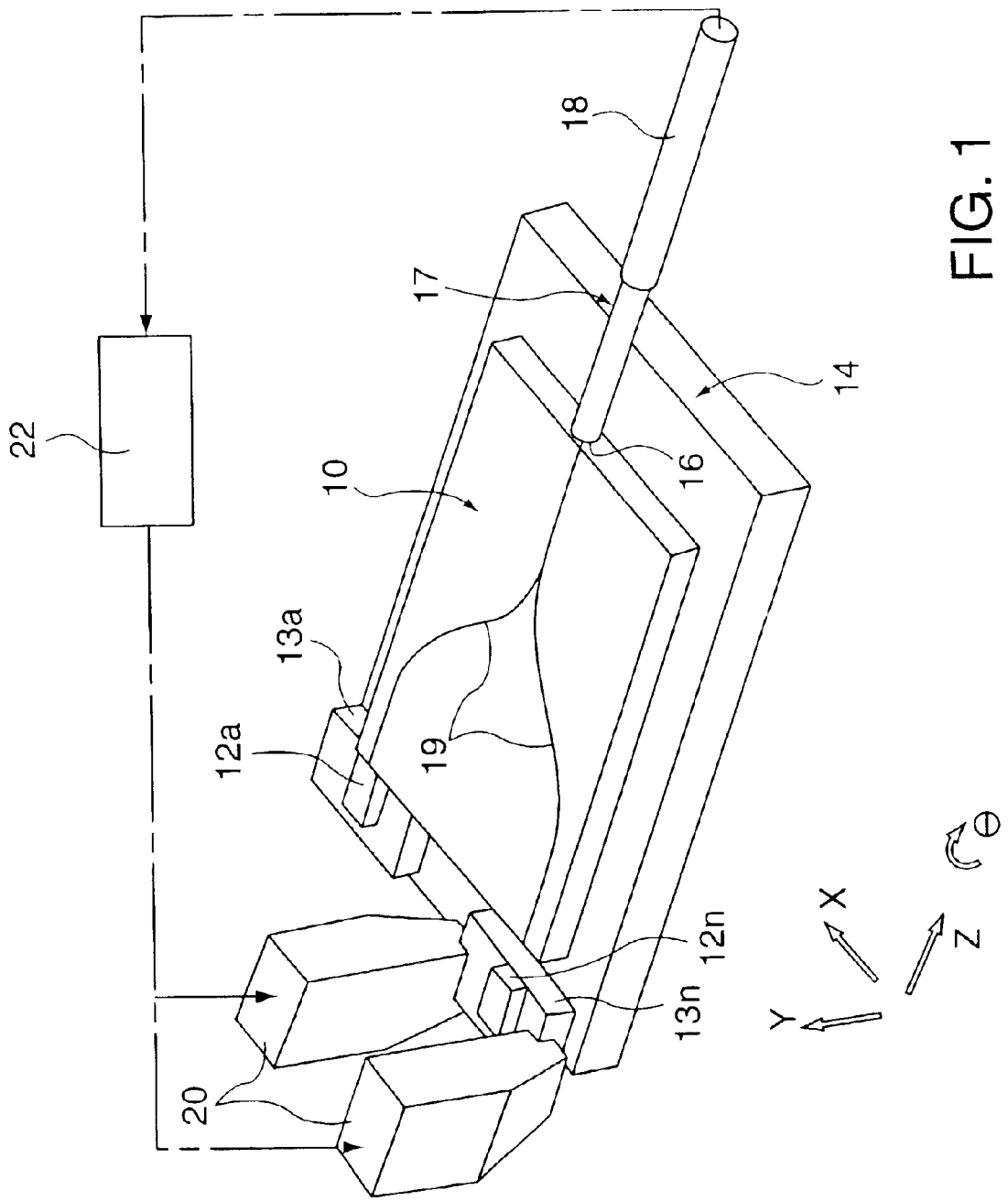
FIG. 1 is a perspective view of an optoelectronic module to which a plurality of light sources are being coupled in accordance with the present invention.

The drawing is not necessarily to scale.

DETAILED DESCRIPTION OF THE INVENTION

Referring now to FIG. 1, there is shown a perspective view of an optoelectronic (radiation) module 10, hereinafter referred to as an optical integrated circuit (OIC), to which a plurality of light (radiation) sources 12a–12n (only light sources 12a and 12n are shown) are being coupled to form an assembly in accordance with the present invention. The OIC 10 is fixedly mounted on an optical carrier member 14 and comprises a plurality of optical input ports (not shown) and an optical output port 16 which is coupled to a first end of an optional optical fiber 17. A light (radiation) detecting device 18, which is disposed adjacent a second end of the optical fiber 17, measures light (radiation) produced at the optical (radiation) output port 16 from any one or more of the optical input ports. In some applications light detecting device 180 can be coupled directly to output port 16 without the need for an optical fiber 17. The OIC 10 can comprise a piece of silica or such substrate comprising optical waveguides 19 formed therein or thereon, and components (not shown) for providing whatever function is required for the input optical signal from each of the plurality of light sources 12a–12n.

Each of the light sources 12a–12n is mounted on a separate one of submounts 13a–13n with only 13a and 13n being shown to form a chip-on-carrier assembly. Once the OIC 10 is fixedly mounted on the optical carrier member 14, each of the plurality of light sources 12a–12n is separately moved into its final position by mechanical grippers 20 to couple light therefrom into a predetermined separate one of the plurality of optical input ports. The light source 12a is shown as having been moved into its final fixed position. The description which follows for the positioning of light source 12n applies to the positioning of each of the plurality of light sources 12a–12n to it separate input light port on the OIC 10. As is shown for light source 12n, the grippers 20 are caused to grip opposing edges of the submount 13n of the light source 12n and are selectively moved in the X, Y, Z and $\theta_x$ directions until the light source 12n is adjacent a predetermined separate optical input port on the OIC 10. During this positioning process, the light source 12n is energized to produce a low power and pulsed output light beam since the chip-on-carrier assembly cannot sufficiently remove heat from a full-powered light source 12n. Therefore, the power provided to the light source 12n is sufficiently low such that the light source 12n will not overheat and fail during the alignment process with the associated separate optical input port of the OIC 10.

Once the light source 12n is positioned adjacent its associated separate input light port on the OIC 10, the light from light source 12n enters the associated light port and propagates via the waveguides 19 and components of the OIC 10 to the optical output port 16. The light at the optical output port 16 is detected by the light detecting device 18 which generates an output signal representing a measure of the amount of light produced at the optical output port 16 from the light source 12n. The output signal from the light detecting device 18 can be used, for example, by an optional control device 22 (shown in a dashed line rectangle) for automatically moving the grippers 20 in the X, Y, and Z, and/or a $\theta_x$ direction, to maximize the light from the light source 12n at the optical output port 16. Alternatively, the grippers 20 can be moved manually until a maximum light signal is detected by the light detecting device 18. Once a maximum light signal is detected from the light source 12n at the optical output port 16, the light source 12n is fixedly mounted to the optical carrier member 14 (e.g., preferably by soldering the submount 13n, across its complete base, to the optical carrier member 14 to provide an excellent thermal contact with the optical carrier member 14), and the pulsed power is turned off. The procedure outlined hereinabove is then repeated for all of the remaining light sources 12a–12n that have to be positioned adjacent a predetermined separate optical input port on the OIC 10. In a presently preferred embodiment, once all of the light sources 12a–12n have been properly mounted on the optical carrier member 14, the base of the optical carrier 14 can be coupled to heat dissipation means (not shown) which could be a thermoelectric cooler, heat sink, flow of air, or refrigerant, etc. if the optical carrier 14 itself is not capable of removing sufficient heat from the plurality of light sources 12a–12n when operational at full power. Optionally, individual heat dissipating means such as a heat sinks, cooling air generating devices, or refrigerants, etc. can be coupled to each of light sources 12a–12n as each is fixed via its submount 13a–13n to optical carrier 14. The light sources 12a–12n can be coupled either directly to the associated optical input ports of the OIC 12, or via a lens, and can have the same or different output wavelengths.

Figure 2:
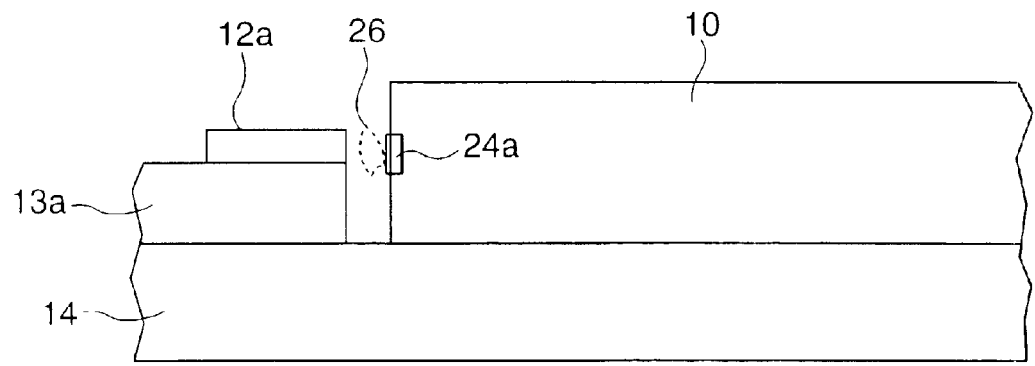
FIG. 2 is a partial enlarged side view of an optoelectric module and one of a plurality of light sources coupled thereto in accordance with the present invention.

Referring now to FIG. 2, there is shown a partial enlarged side view of an optoelectric module (OIC) 10 and a light source 12a (being one of a plurality of light sources 12a–12n) which is coupled to a predetermined separate optical input port 24a of the OIC 10 in accordance with the present invention. Once the light source 12a is positioned adjacent the predetermined associated optical input port 24a of the OIC 10, the light from the light source 12a can be coupled either directly into an optical input port 24a of the OIC 10, or via an optional lens 26 (shown in a dashed line format) to provide a maximum optical coupling therebetween.

Figure 3:
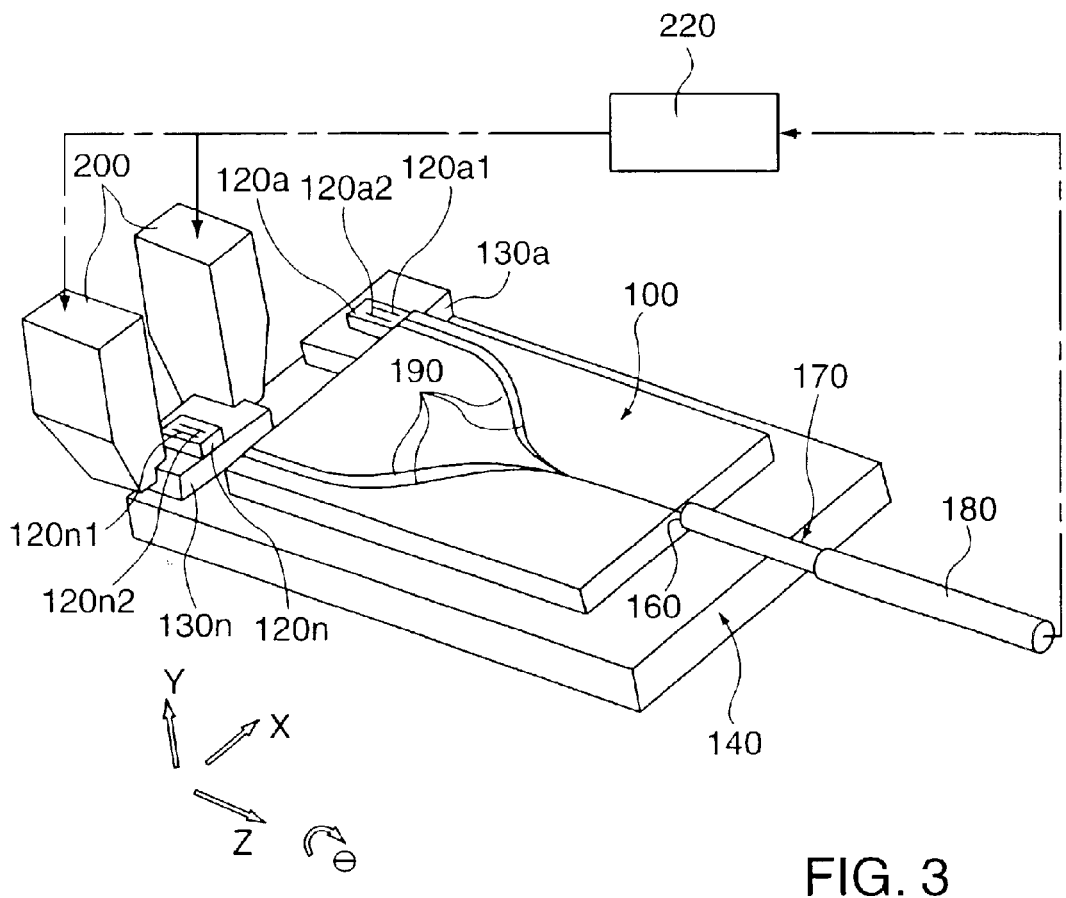
FIG. 3 is a perspective view of an optoelectronic module to which a plurality chips each containing multiple light sources are being coupled in accordance with the present invention.

Referring now to FIG. 3, there is shown a perspective view of an optoelectronic (radiation) module 100, hereinafter referred to as an optical integrated circuit (OIC), to which a plurality of chips 120a–120n (only 120a and 120n being shown) each containing two light (radiation) sources 120a1, 120a2 . . . 120n1, 120n2 (only light sources 120a1, 120a2, and 120n1, 120n2 are shown) are being coupled to form an assembly in accordance with the present invention. Optionally, each of the chips 120a–120n can contain more than two light sources. The OIC 100 is fixedly mounted on an optical carrier member 140 and comprises a plurality of optical input ports (not shown) and an optical output port 160 which is coupled to a first end of an optional optical fiber 170. A light (radiation) detecting device 180, which is disposed adjacent a second end of the optical fiber 170, measures light (radiation) produced at the optical (radiation) output port 160 from any one or more of the optical input ports. In some applications light detecting device 100 can be coupled directly to output port 160 without the need for an optical fiber 170. The OIC 100 can comprise a piece of silica or such substrate comprising optical waveguides 190 formed therein or thereon, and components (not shown) for providing whatever function is required for the input optical signal from each of the plurality of light sources 120a1–120n2.

Each of chips 120a–120n is mounted on a separate one of submounts 130a–130n with only submounts 130a and 130n being shown to form chip-on-carrier assemblies. Once the OIC 100 is fixedly mounted on the optical carrier member 140, each of the plurality of chips 120a–120n is separately moved into its final position by mechanical grippers 200 to couple light from each of the light sources contained therein into a predetermined separate pair of the plurality of optical (radiation) input ports. The light sources 120a1 and 120a2 of chip 120a are shown as having been moved into their final fixed position. The description which follows for the positioning of light sources 120n1 and 120n2 of the chip 120n applies to the positioning of each of light sources of the additional chips to separate pairs of input light ports on the OIC 100. As is shown for chip 120n, the grippers 200 are caused to grip opposing edges of the submount 130n on which chip 120 is mounted and are selectively moved in the X, Y, and Z and $\theta_x$ directions until the light sources 120n1 and 120n2 are adjacent a predetermined separate pair of optical input ports on the OIC 100. During this positioning process, the light sources 120n1 and 120n2 of chip 120n are energized to produce a low power and pulsed output light beam since the chip-on-carrier assembly in some instances cannot sufficiently remove heat from full-powered light sources. Therefore, the power provided to the light sources 120n1 and 120n2 is sufficiently low such that these light sources will not overheat and fail during the alignment process with the associated separate optical input port of the OIC 100.

Once the light sources 120n1 and 120n2 are positioned adjacent to a pair of separate input light ports on the OIC 100, the light from these light sources enters the associated light input ports and propagates via the waveguides 190 and components of the OIC 100 to the optical output port 160. The light at the optical output port 160 is detected by the light detecting device 180 which generates an output signal representing a measure of the amount of light produced at the optical output port 160 from the light sources 120n1 and 120n2. The output signal from the light detecting device 180 can be used, for example, by an optional control device 220 (shown in a dashed line rectangle) for automatically moving the grippers 200 in the X, Y, and Z, and/or a $\theta_x$ direction, to maximize the light from the light sources 120n1 and 120n2 at the optical output port 160. Alternatively, the grippers 200 can be moved manually until a maximum light signal is detected by the light detecting device 180. Once a maximum-light signal is detected from the light sources 120n1 and 120n2 at the optical output port 160, the chip 120n containing light sources 120n1 and 120n2 is fixedly mounted to the optical carrier member 140 (e.g., preferably by soldering the submount 130n, across its complete base, to the optical carrier member 140 to provide an excellent thermal contact with the optical carrier member 140), and the pulsed power is turned off. The procedure outlined hereinabove is then repeated for all of the remaining chips that have to be positioned adjacent predetermined pairs of separate optical input ports on the OIC 100. In a presently preferred embodiment, once all of the light sources 120a1–120n2 have been properly mounted on the optical carrier member 140, the base of the optical carrier 140 can be coupled to heat dissipation means (not shown) which could be a thermoelectric cooler, heat sink, flow of air, or refrigerant, etc. if the optical carrier 140 itself is not capable of removing sufficient heat from the light sources 120a1–120n2 when they are operated at full power. Optionally, individual heat dissipating means such as a heat sinks, cooling air generating devices, or refrigerants, etc. can be coupled to each of chips 120a–120n as each is fixed via its submount 130a–130n to optical carrier 140. The light sources 120a1–120n2 can be coupled either directly to the associated optical input ports of the OIC 100, or via a lens, and can have the same or different output wavelengths.

It is to be appreciated and understood that the specific embodiments of the present invention described hereinabove are merely illustrative of the general principles of the present invention. Various modifications may be made by those skilled in the art which are consistent with the principles set forth. For example, any suitable type module and associated radiation source can be used in place of the optoelectronic module and light sources described hereinbefore.

What is claimed is:

1. A method of forming an assembly comprising a plurality of n radiation sources which each require heat dissipating means during normal operation thereof, a module comprising a plurality of n radiation input ports and an output port, the method comprising the steps of:

(a) attaching the module on a carrier member;

(b) turning on a first radiation source and operating it at a substantially lower power level than is used during normal operation thereof such that the first radiation source is not caused to fail even without the heat dissipating means being coupled thereto;

(c) positioning the first radiation source relative to a first one of the n radiation input ports such that radiation emitted by the first radiation source is incident on the first radiation port;

(d) repositioning the first radiation source while it is powered with the substantially lower power than is used during normal operation until a signal emitted at the output port of the module has a maximum level;

(e) attaching the first radiation source to the carrier member; and (f) repeating steps (b) through (e) for each of the remaining n–1 plurality of radiation sources.

2. The method of claim 1 wherein in performing step (d) performing the substeps of:

(d1) generating control signals to a radiation source moving control device from the radiation detector representing the radiation level occurring at the output port of the module from the radiation source being repositioned; and (d2) causing the radiation source moving control device to automatically move the radiation source in predetermined directions in response to the control signals from the radiation detector until a maximum intensity radiation level is obtained at the output port of the module.

3. A method of coupling a plurality of n light sources to an optoelectronic module comprising a plurality of n optical input ports and an optical output port, comprising the steps of:

(a) attaching the optoelectronic module to a carrier member;

(b) coupling a light detector to the optical output port;

(c) sequentially moving each of the plurality of n light sources adjacent a separate one of the plurality of n optical input ports while pulsing the light source being moved with a low power signal sufficient to prevent failure of the light source;

(d) attaching each of the light sources adjacent the separate one of the n optical input ports when a maximum light intensity signal propagating through the optoelectronic module from the light source is detected by the light detector; and (e) attaching, if needed, a heat dissipating means to a base of the carrier member capable of removing sufficient heat from the n light sources and the optoelectronic module to prevent overheating thereof during normal operation thereof.

4. The method of claim 3 wherein in performing step (c) performing the substeps of:

(c1) moving a first light source adjacent the separate one of the plurality of n optical input ports while pulsing the first light source with the low power signal;

(c2) monitoring the light intensity signal produced by the first light source at the optical output port with the optical detector;

(c3) repositioning the first light source until a maximum light intensity signal propagating through the optoelectronic module from the light source is detected by the light detector; and (c4) repeating steps (c1), (c2), and (c2) for each of the remaining plurality of n−1 light sources.

5. The method of claim 3 wherein in performing step (c), performing the substeps of:

(c1) generating control signals to a light source moving control device from the light detector representing the light intensity occurring at the optical output port of the optoelectronic module from the light source being moved; and (c2) causing the light source moving control device to automatically move the light source in predetermined directions in response to the control signals from the light detector until a maximum light intensity signal is obtained at the optical output port of the optoelectronic module.

6. A method of coupling a plurality of n light sources to an optoelectronic module comprising a plurality of n optical input ports and an optical output port, comprising the steps of:

(a) attaching the optoelectronic module to a carrier member;

(b) coupling a light detector to the optical output port;

(c) moving a first one of the plurality of light sources adjacent a separate one of the plurality of n optical input ports while pulsing the light source with a low power signal sufficient to prevent overheating of the light source;

(d) attaching the first one of the light sources adjacent the separate one of the n optical input ports when a maximum light signal propagating through the optoelectronic module from the light source is detected by the light detector;

(e) repeating steps (c) and (d) for each of remaining n−1 plurality of light sources; and (f) attaching, if needed, a heat dissipating means to a base of the carrier member capable of removing sufficient heat from the n light sources and the light detector to prevent overheating thereof during normal operation thereof.

7. A method of forming an assembly comprising n radiation sources which each require heat dissipating means during normal operation, where n is a number greater than one, and a radiation sensitive detector having m inputs, where m is a number greater than one, and having an output port, the method comprising the steps of:

(a) attaching the radiation detector to a carrier member;

(b) turning on a first one of the n radiation sources and operating same at a substantially lower power than is used during normal operation such that same does not overheat even without the heat dissipating means being coupled thereto;

(c) positioning the first radiation source of step (b) relative to a first one of the m inputs of the detector such that radiation emitted by the first radiation source is incident on the first input of the detector;

(d) repositioning the first radiation source while it is powered with the substantially lower power than is used during normal operation until a signal emitted at the output of the detector reaches a maximum level;

(e) fixedly attaching the first radiation source to the carrier member;

(f) repeating the steps (b), (c), (d), and (e) for a second one of the n radiation sources;

(g) repeating the steps (b), (c), (d), and (e) for any additional radiation sources; and (h) attaching, if needed, a heat dissipating means to a base of the carrier member capable of removing sufficient heat from the n radiation sources and the radiation detector to prevent overheating thereof during normal operation thereof.

8. A method of forming an assembly comprising n chips, where n is greater than 1, with at least one of the n chips having formed therein two radiation sources which requires heat dissipating means during normal operation thereof, with each of the remaining n−1 chips having formed therein at least one radiation source which requires heat dissipating means during normal operation thereof, and a radiation detector comprising a plurality of radiation input ports and an output port, the method comprising the steps of:

(a) attaching the radiation detector on a carrier member;

(b) turning on the two radiation sources of one of the n chips and operating same at a substantially lower power level than is used during normal operation thereof such that the two radiation sources are not caused to fail even without heat dissipating means being coupled thereto;

(c) positioning the one of the n chips relative to a first set of the radiation input ports such that radiation emitted by the two radiation sources of the one chip is incident on separate ones of the radiation inputs ports;

(d) repositioning the one chip while the two radiation sources thereof are powered with the substantially lower power than is used during normal operation until a signal emitted at the output port of the module has a maximum level;

(e) attaching the one chip to the carrier member; and (f) repeating steps (b) through (e) for each of the remaining n−1 chips.

9. The method of claim 8 further comprising the step of coupling heat dissipating means to each of the n chips so as to dissipate heat generated by the n chips during operation of the radiation sources.

10. The method of claim 8 further comprising coupling heat dissipating means to the carrier member so as to dissipate heat generated by the n chips during operation of the radiation sources and by the module during operation thereof.

11. The method of claim 8 wherein the radiation sources are light sources and the module is an optoelectronic device.

12. The method of claim 11 wherein each of the radiation sources is a laser.

13. The method of claim 8 wherein each of the chips is soldered to the carrier member.

14. The method of claim 8 wherein each of the chips has two radiation sources.

15. The method of claim 14 wherein each of the radiation sources is a laser.

16. The method of claim 8 wherein n=4, the radiation sources are all lasers, the radiation detector is an optoelectric module, and each of the chips is soldered to the carrier member.

* * * * *